Nov. 22, 1949     L. W. HOLLINGSWORTH     2,488,540
MARINE REDUCTION REVERSE GEAR
Filed Jan. 24, 1944     4 Sheets-Sheet 2
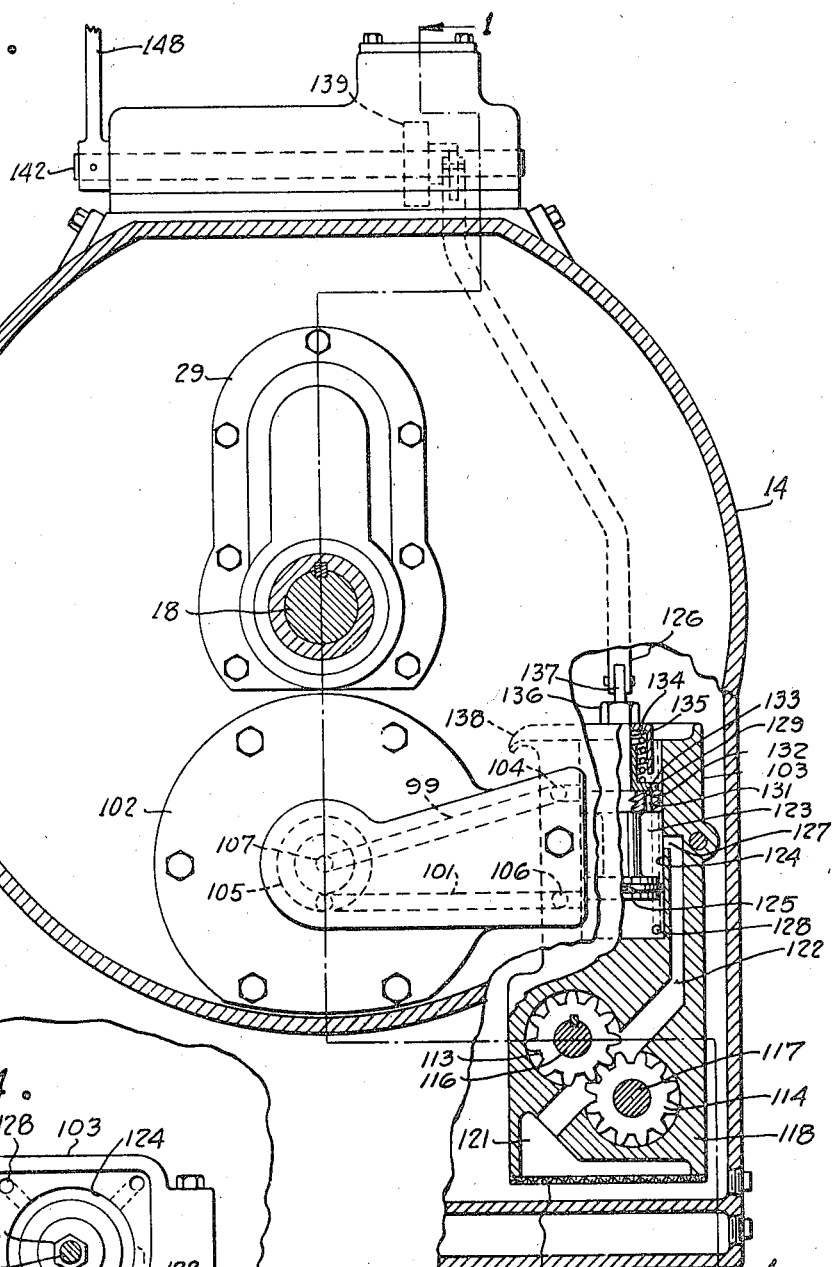
FIG. 3.
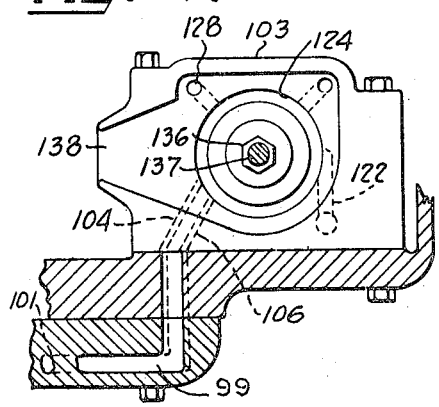
FIG. 4.
INVENTOR
LEON W. HOLLINGSWORTH
BY Harold D. Cook
ATTORNEY

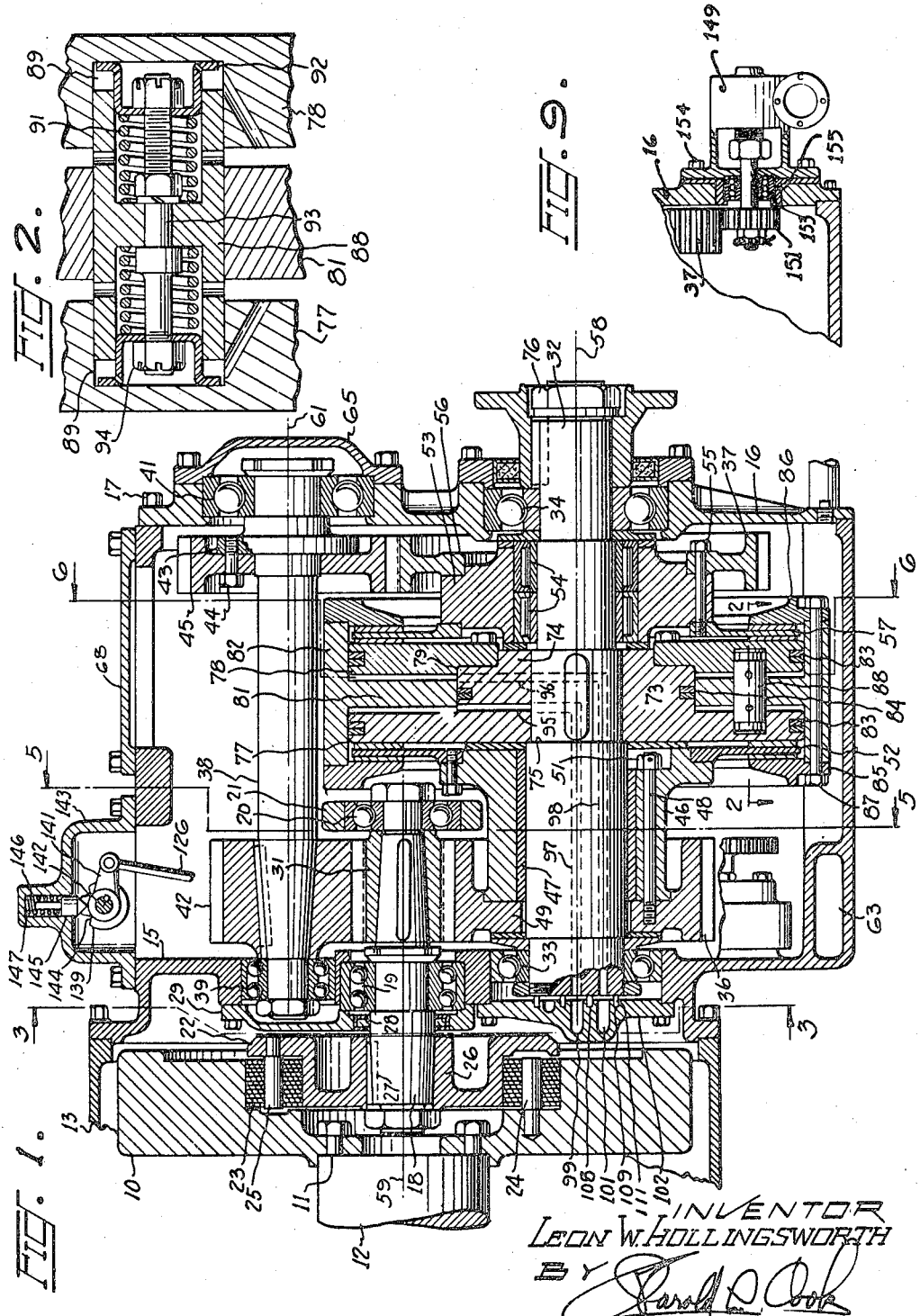

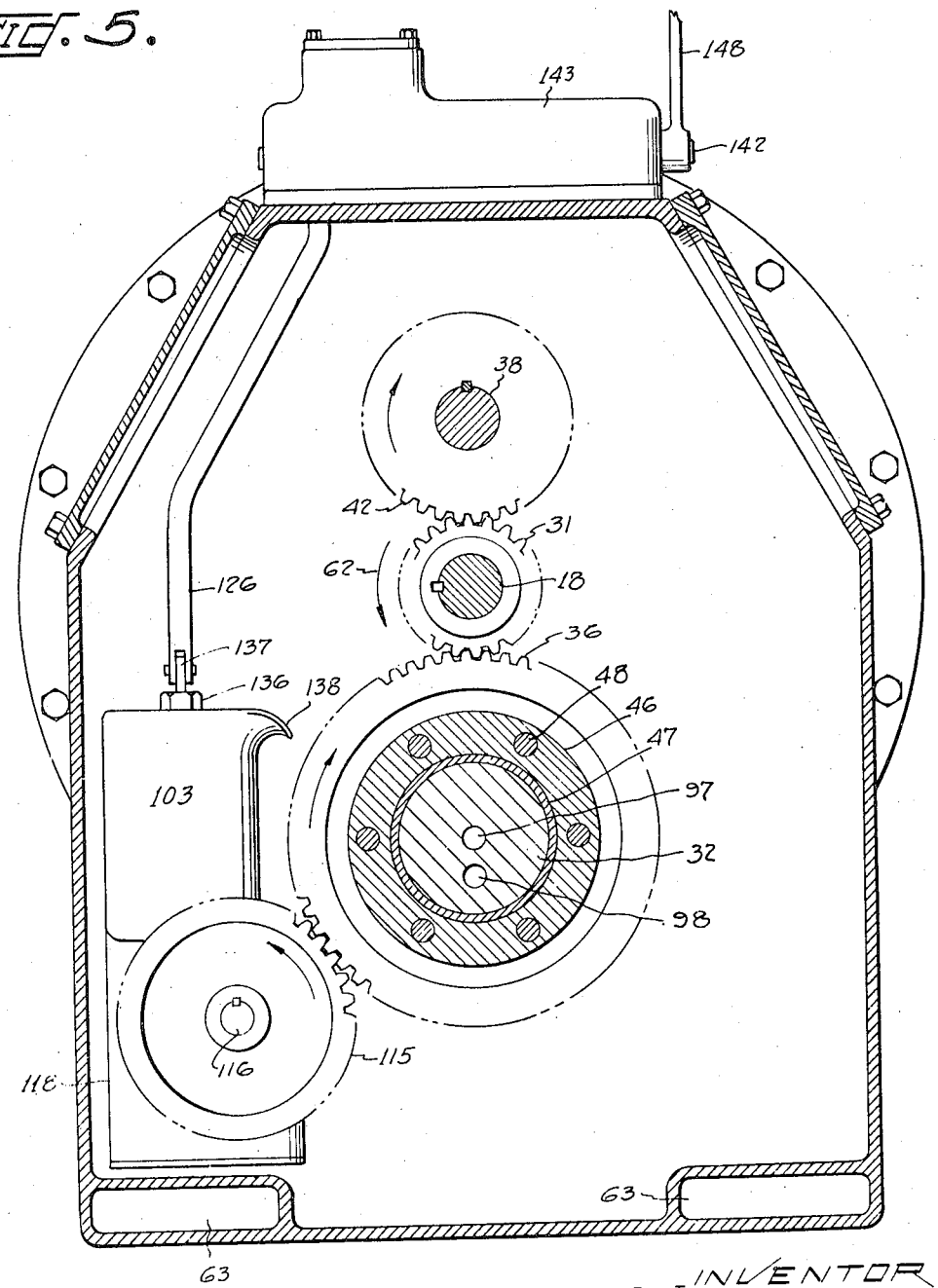

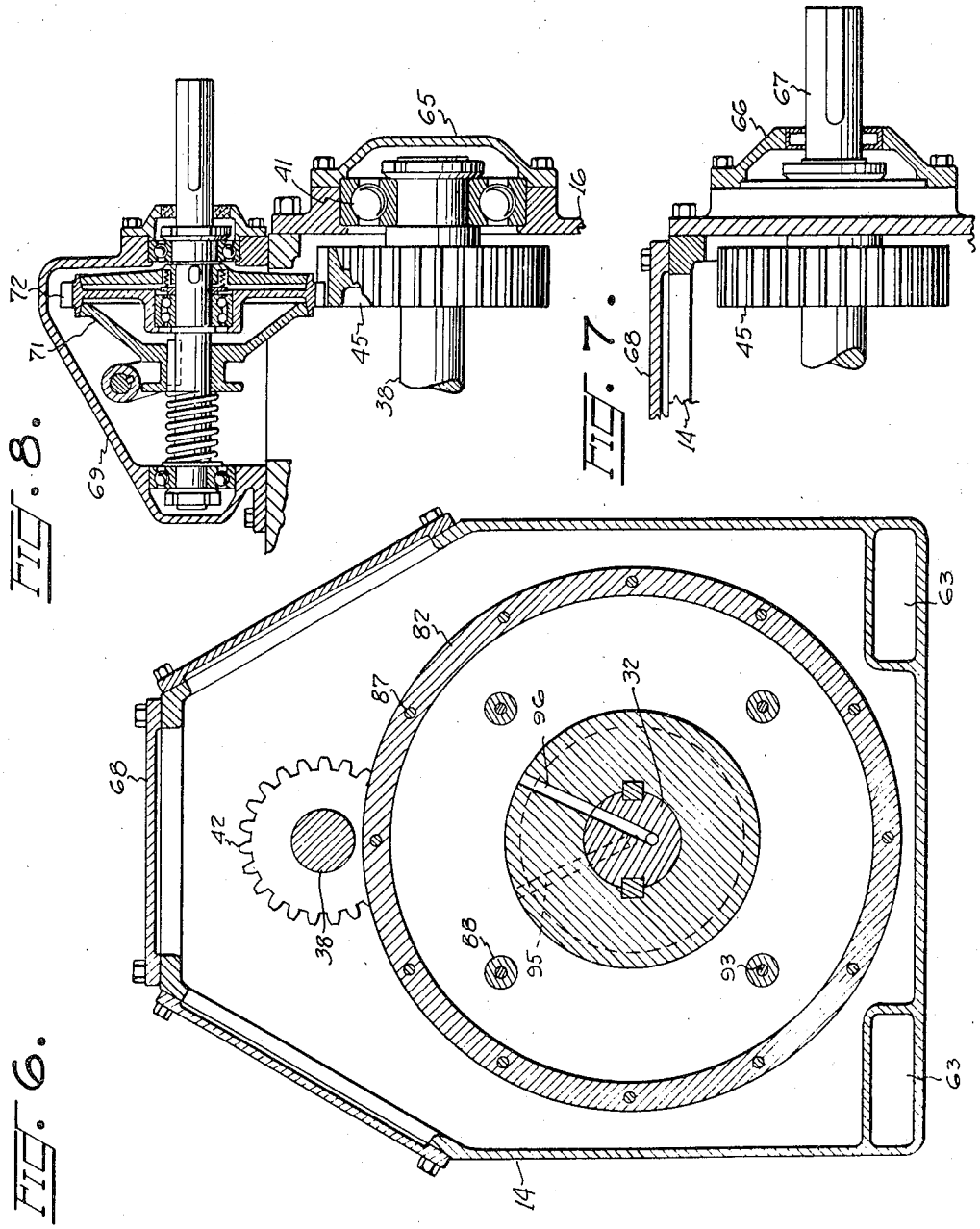

Patented Nov. 22, 1949

2,488,540

UNITED STATES PATENT OFFICE 2,488,540

MARINE REDUCTION REVERSE GEAR

Leon W. Hollingsworth, Los Angeles, Calif., assignor to Western Gear Works, Lynwood, Calif., a corporation of Washington Application January 24, 1944, Serial No. 519,553

8 Claims. (Cl. 74—377)

This invention relates to power transmission mechanisms, and has particular reference to marine reduction reverse gears for transmitting power from a prime mover engine to the propeller shaft of a marine vessel.

It is an object of the present invention to provide a power transmission mechanism, having offset input and output shafts, which is compact and of good appearance, and in which gear ratios may be changed for either ahead or reverse direction of operation without changing centers between input and output shafts.

It is a further object of the invention to provide a power transmission mechanism having a helical or spur gear train for both ahead and reverse drives, in which all gears, shafts and bearings are supported in the housing for the transmission mechanism and are unaffected by minor misalignments between the engine and gear, or between the gear end and the propeller shaft.

It is a further object of the invention to provide a power transmission mechanism having helical or spur gear trains for both ahead and reverse drives in which all wearing parts are enclosed in one housing and lubricated by a common oil bath.

It is a further object of the invention to provide a power transmission mechanism having means for operating one or more power take-off mechanisms for long periods of time in one direction of rotation, regardless of whether or not power is transmitted to the driven shaft, or of the direction of operation of the driven shaft.

It is a further object of the invention to provide a power transmission mechanism particularly applicable for marine use, having a reverse speed equal to or greater than the ahead speed, and in which the ahead and reverse drives are capable of transmitting sustained full power in either direction of operation.

It is a further object of the invention to provide a transmission mechanism particularly applicable for marine use which can be combined in multiple units for transmitting power from two or more engines of the same direction of rotation for driving right and left hand propellers.

It is a further object of the invention to provide a novel arrangement of ahead and reverse gear trains in a power transmission mechanism which enables the use of a large diameter clutch on the output shaft in a construction wherein the radius of the clutch is greater than the center distance between the input and output shafts.

It is a further object of the invention to provide a power transmission mechanism particularly applicable for marine use, in which the driven gears of ahead and reverse gear trains are journaled on the output shaft, and in which hydraulically or mechanically operated clutches mounted on the output shaft between said gear trains provides driving connection between the said driven gears and the output shaft.

It is a further object of the invention to provide a power transmission mechanism employing hydraulically actuated clutch means and a pump for supplying oil under pressure to said clutch actuating means, said transmission being characterized by the total absence of pipe connections of any kind and by the fact that all sealed or gasketed joints through which leakage might occur are on the inside of the transmission case so that oil flowing through said sealed or gasketed joints is returned to the supply of oil in said case.

It is a further object of the invention to provide a construction for power transmission mechanisms which is applicable to structures employing a wide range of power and speed ratios in either direction of operation without necessitating material changes in construction; in which adjustments may readily be made with simple tools by more or less unskilled labor while the transmission mechanism is connected to a prime mover engine; and which is of simple construction, reliable in operation, and easily manipulated.

With these and other objects and advantages in mind, the invention resides in the novel construction and combination of parts hereinafter described, illustrated in the accompanying drawings, and set forth in the appended claims; it being understood that various changes within the scope of the claims may be resorted to without departing from the spirit or sacrificing any of the advantages of the invention.

In the drawings: Figure 1 is a longitudinal sectional elevation of a power transmission mechanism embodying the invention, taken on the line 1—1 of Figure 3; Figure 2 is a longitudinal sectional elevation, taken on the line 2—2 of Figure 1, showing the mechanism for urging the piston element of the hydraulically actuated clutch to neutral position; Figure 3 is a transverse section of the transmission mechanism, taken on the line 3—3 of Figure 1, parts being broken away and shown in section, illustrating the construction of the gear pump and control valve for actuating the clutch unit; Figure 4 is a plan view of the control valve; Figure 5 is a transverse sectional elevation of the transmission mechanism, taken on the line 5—5 of Figure 1, illustrating the ahead gear train and the drive for the gear pump; Figure 6 is a transverse sectional elevation of the transmission mechanism, taken on the line 6—6 of Figure 1, illustrating the construction of the clutch unit; Figure 7 is a fragmentary sectional elevation of a modification of the transmission mechanism, illustrating means for driving the power take-off mechanism; Figure 8 is a fragmentary sectional elevation of a further modification of the transmission mechanism, illustrating a power take-off mechanism; and Figure 9 is a fragmentary sectional elevation of a power transmission mechanism, illustrating a power take-off mechanism for driving a pump.

The structure shown in the drawings comprises the flywheel 10 secured to the bolting flange 11 of the crank shaft 12 of a prime mover engine (not shown). The flywheel 10 is mounted in a housing 13 to which is bolted the housing 14 of a power transmission mechanism embodying the invention. The housing 14 comprises a forward wall 15 and an after wall 16 secured to the housing 14 by suitable means such as stud bolts 17 engaging tapped recesses in mounting rings provided therefor. The housing 14 is provided with openings for purposes of inspection and repair, these openings being closed by suitable cover plates as will presently be described. Gaskets (not shown) seal the openings to make the housing fluid tight.

Mounted within the housing 14, in axial alignment with the crank shaft 12 of the prime mover engine, is an input shaft 18 journaled in a bearing 19 carried in the forward wall 15 and in a bearing 20 carried in an arch 21 cast as an integral part of the housing 14. A drive pinion 31 keyed to the input shaft 18 is straddle mounted between the bearing 19 mounted in the forward wall 15 and bearing 20 mounted in the arch 21. If desired, the pinion 31 and shaft 18 may be machined from a single casting and so form an integral unit. A sealing ring 28 is mounted in the forward cover plate 29 which provides access to the bearing 19 carried in the forward wall 15 of the housing.

A coupling 22 is provided for coupling the input shaft 18 to the flywheel 10. The coupling 22 comprises a laminated leather or other non-metallic ring 23 which may have driving connection with the flywheel 10 by means of a plurality of pins 24, pressed into holes in the flywheel 10, as illustrated, or carried by a plate bolted to the flywheel in a manner well known in the art. The laminated ring 23 drives the coupling member 22 by means of a plurality of angularly spaced pins 25 secured in the coupling member 22 and extending through the laminated ring 23. The coupling member 22 is provided with a hub 26 closely fitting the end of the input shaft 18 and secured thereto as by a key 27, whereby the shaft 18 partakes of the rotary movement of the coupling. The coupling member 22, having vibration damping properties, serves to eliminate torsional vibration which otherwise may be transmitted from the engine to the gear, or from other sources, and also absorbs minor misalignments between the engine and the gear caused by deflection in the gear or engine housings due to misalignment between the gear and the propeller shaft. This misalignment may not be present at the time of installation, but often develops due to shifting of the vessel in the seaway, or from the natural drop of the engine.

The output shaft 32 is journaled in a bearing 33 mounted in the forward wall 15 and in a bearing 34 mounted in the after wall 16. The after wall 16 is piloted in a bore 35 in the housing 14 concentric with the output shaft 32. Journaled on the output shaft 32 is the reduction gear 36 for forward drive, and the reduction gear 37 for reverse drive, and keyed to the output shaft is a double clutch mechanism presently to be described.

A countershaft 38 is journaled in a bearing 39 mounted in the forward wall 15 and in a bearing 41 mounted in the after wall 16. Keyed to the countershaft 38 and in constant mesh with the drive pinion 31 is a gear 42. Adjacent the after wall 16 the countershaft 38 is provided with a bolting flange 43, and secured thereto as by bolts, or key and nut 44, is a pinion 45, both the gear 42 and pinion 45 partaking of the rotary movement transmitted by the drive pinion 31, the pinion 45 meshing with the reverse reduction gear 37 journaled on the output shaft 32.

Each of the several shafts is supported at each end to minimize deflection of the shaft, the supporting bearings being so arranged that the several gears are mounted on the shaft between the bearings which support the ends of the shaft. The forward reduction gear 36 is bolted to a hub 46 having a bushing 47 journaled on the shaft 32. A stud 48 engages a tapped recess in the flange 49 of the gear 36 and extends through the hub 46 securing the gear to the hub by means of a nut 51 threaded on the outer end of the stud. It will readily be understood, of course, that the gear 36 and hub 46 may be formed as an integral unit. Affixed to the hub 46 is a clutch plate 52, the hub being of sufficient length to permit the clutch plate 52 to extend radially into the space between the end of the input shaft 18 and the reverse gear train 37—45. The gear 36 being in constant mesh with the pinion 31, the clutch plate 52 is driven continuously in a direction opposed to the direction of rotation of the input shaft 18.

The reverse reduction gear 37 comprises a hub 53 journaled on bearings 54 having raceways pressed on the output shaft 32. A through bolt 55 extends through the flange 56 of the gear 37 and through the hub 53, and engages a clutch plate 57 for securing these parts in unitary relation. The clutch plate 57 extends radially of the hub 53 in parallelism with the clutch plate 52 secured to the hub 46, and likewise extends into the space provided for the clutch mechanism between the ahead and reverse gear trains. Power to drive the gear 37 is transmitted from the input shaft 18 by way of drive pinion 31, gear 42, countershaft 38, and pinion 45 with which the gear 37 is constantly in mesh. Thus the gear 37 and clutch plate 57 are driven continuously in the direction of rotation of the input shaft 18.

For the purpose of balancing the thrust of the drive pinion 31 against the propeller thrust and thus relieving the propeller thrust bearing of a part of its load, the drive pinion 31 preferably is cut with a left hand helix.

In a boat equipped with twin propellers driven by separate engines of the same rotation, the reverse reduction gears will be identical. The starboard unit is operated continuously in the ahead position for forward drive and requires a right hand propeller. The port unit is operated continuously in the reverse position for forward drive and requires a left hand propeller. The drive from one or more of the engines is transmitted through the pinion 31 and gear 36 for driving right hand propellers, as viewed from aft; whereas the drive from other of the engines is transmitted through the pinion 31, gear 42, shaft 38, pinion 45 and gear 37 for driving left hand propellers, also viewed from aft. The method of operation above outlined is desirable in a boat equipped with a single rudder. To facilitate this operation the pinion 45 on each unit is preferably cut with a right hand helix. With this construction the thrusts for both right and left propellers are balanced in the ahead position, but are accumulative in the reverse position. However, since the periods of operation in reverse are of short duration, and usually at reduced speeds, the unbalanced condition in the reverse position is of no great consequence.

In the construction illustrated in the drawings, the center line 58 of the output shaft 32 is vertically spaced from the center line 59 of the input shaft 18. It is not intended, however, that the invention shall be limited in scope to structures in which the shafts are in vertical alignment, since it is obvious that the shafts may be horizontally arranged in mechanisms embodying modifications of the structure illustrated. In one model of a marine reduction gear embodying the invention, the center line 58 is spaced from the center line 59 by a distance of six inches, which is sufficient to obtain a gear reduction which may vary between ratios of from 1.5:1 to 3.73:1, according as the sizes of the pinion mounted on the input shaft 18 and the gear journaled on the output shaft 32 may be varied. It is, accordingly, an advantage of the invention that a number of gear ratios may be had between the input and output shafts without changing the centers of rotation of the gears on any one of the three shafts; and, likewise, the desired gear ratio between forward and reverse drives may be obtained.

In these devices, also, the center line 61 of the countershaft 38 is spaced from the center line 59 of the input shaft a distance equal to approximately two-thirds of the distance between the center lines 58 and 59. The relatively great distance between the countershaft 38 and the output shaft 32 makes possible the use of a pinion 45 of relatively large diameter in proportion to the gear 42, and the same amount of power can be transmitted with approximately two-thirds the gear face as is necessary for the gear train for forward drive, thus making it possible to transmit full sustained power in either direction of rotation of the output shaft 32.

This arrangement of shafts and gears also makes possible the use of a large diameter clutch on the output shaft 32 without increasing the distance between the center lines of the input and output shafts. For example, in the one model of marine reverse gears hereinabove mentioned, the clutch diameter is sixteen inches. In this connection, it will be noted that the drive pinion 31 and gears 36 and 42 are mounted at the forward end of the housing adjacent the forward wall 15, whereas pinion 45 and reverse reduction gear 37 are mounted at the end of the housing adjacent the after wall 16. The arch 21 provides a support intermediate the ends of the housing of the inner end of the input shaft 18, thus providing a space between the ahead and reverse gear trains for a double clutch unit mounted on the output shaft 32 and having a radius exceeding the distance between the center lines of the input and output shafts. A further advantage of this construction is that clutch elements of relatively large diameter may be employed in a mechanism wherein the bottom of the housing 14 is but a relatively short distance below the center line 59 of the input shaft.

The direction of rotation of the drive pinion 31 may be as indicated by the arrow 62 in Figure 5, as viewed from the after end of the mechanism. In this event, the forward reduction gear 36 at the forward end of the housing is driven in the counterclockwise direction, and the reverse reduction gear 37 at the after end of the housing is driven in the clockwise direction, as viewed from the forward end of the mechanism. The housing 14 being supplied with oil in sufficient quantity to submerge the lower portions of the gears 36 and 37, a generally circulatory motion is imparted to the oil, causing it to flow in the direction induced by operation of these gears. It follows as a matter of course that all gears and pinions meshing with the gears 36 and 37 are lubricated by the oil applied thereto by these last mentioned gears. The circulatory motion imparted to the oil by the gears 36 and 37 lessens the tendency of the oil to churn in the housing, and so lessens the tendency of the oil to generate heat, and maintains the overall efficiency of the mechanism.

A water jacket 63 is cast as an integral part of the two lower sides and lower forward end of the housing, said water jacket having pipe connections, one of which is shown at 64, through which water may be introduced into the water jacket 63 to produce a flow in a direction counter to the flow of oil for cooling the oil.

In Figure 7 is shown a fragmentary detail of a mechanism embodying a modification of the structure illustrated in Figure 1. The modified structure illustrates a power take-off for driving deck machinery, pumps, or other equipment. In this structure the cover plate 65 enclosing the bearing 41 has been replaced by a cover plate 66 having a shaft opening therethrough, and a shaft 67 is mounted in the housing 14 in place of the countershaft 38. The countershaft 67 in the modified construction projects from the after end of the housing to facilitate mounting thereon a take-off clutch or belt pulley, or both.

In a further modification of the invention illustrated in Figure 8, the cover plate 68 has been removed and replaced with a housing 69 having a clutch 71 and take-off gear 72 mounted therein in mesh with the pinion 45. It is an important advantage of the invention that power take-off mechanisms embodying either or both of the constructions illustrated in Figures 7 and 8 may be driven continuously in one direction of rotation, irrespective of the direction of operation of the output shaft or the position of the control lever, whether in forward, reverse, or neutral position.

In Figure 9 is illustrated a further modification of the invention incorporating a power take-off mechanism for driving a pump 149 such as may be used for pumping cooling or bilge water. The construction illustrated comprises a gear 151 which meshes with and is driven by the reverse reduction gear 37. The gear 151 is keyed to a shaft 152 journaled in a bearing 153 mounted in the after wall 16. The pump 149 may be secured to the after side of the wall 16 as by means of machine screws 154, by means of which the pump assembly may be detached and removed and the opening 155 closed by a suitable cover plate (not shown). The reverse reduction gear 37 being continuously driven by the pinion 45, the gear 151 is continuously driven in a predetermined direction for driving the pump 149. If desired, a clutch mechanism may be mounted between the gear 151 and the pump impeller.

Mounted on the output shaft 32, between the forward reduction gear 36 and the reverse reduction gear 37, is a hydraulically actuated double clutch unit comprising a hydraulic step bore cylinder 73 having a hub 74 pressed onto and keyed to the output shaft 32 and held against the shoulder 75 by the nut 76. The hydraulic cylinder 73 comprises cylinder heads 77 and 78 which extend radially from the hub 74. The cylinder head 77 comprises an integral part of the hub 74, and forms the driven backing plate for the friction element 52 of the clutch for forward drive. The cylinder head 78 is bolted to a shoulder 79 on the hub casting and forms the driven backing plate for the friction element 57 of the clutch for reverse drive.

The piston is T-shaped in cross section, the vertical member thereof being formed by a ring 81 extending between the cylinder heads 77 and 78, and the cross member being formed by a cylindrical wall 82 overlying the peripheral edges of the cylinder heads. Piston rings 83 provide a seal between the cylindrical wall 82 and the cylinder heads, piston rings 84 being mounted in the hub 74 and providing a seal between the respective ends of the cylinder 73 at that point. The cylindrical wall 82 extends axially of the clutch mechanism to points beyond the clutch plates 52 and 57, respectively, pressure plates 85 and 86 being secured to the ends of the cylindrical wall 82 as by through bolts 87. Each pressure plate (85 and 86) extends inwardly toward the shaft 32 to overlie the adjacent clutch plate (52 and 57) at the respective end of the clutch mechanism. In the neutral position of the clutch the clutch plates 52 and 57 have running clearances with the clutch backing plates 77 and 78 and pressure plates 85 and 86, respectively. This clearance increases as the piston is moved axially of the cylinder 73 to cause the opposite pressure plate to press the clutch plate (52 or 57) into engagement with the cylinder head which forms the backing member for the respective clutch plate. It will readily be understood that the clutch plates 52 and 57, and the pressure plates 85 and 86 may be replaced by a plurality of driving and driven plates, or by single or double cone clutches, in a manner well understood in the art.

The forward reduction gear 36 being driven in the counterclockwise direction, the clutch plate 52 is likewise driven in the counterclockwise direction, whereas the reverse reduction gear 37 and clutch plate 57 are driven in the clockwise direction. By reason of the fact that these friction elements of the clutch are driven in opposite directions, the tendency of one or the other of the cylinder heads to rotate therewith is offset by the tendency of the other cylinder head to rotate with the oppositely turning clutch plate, thus eliminating any drag on the propeller shaft in neutral position.

For urging the piston assembly to neutral position, and for providing driving connection between the cylinder heads and the piston member, the ring 81 is provided with a plurality of angularly spaced pressed in studs 88 which project axially from each face of the piston and engage in recesses 89 provided therefor in the cylinder heads. The studs have sliding engagement with the recesses 89 in the cylinder heads for accommodating movement of the piston in the cylinder, the length of projection of each stud from each face of the piston, plus the thickness of the washer 92, being substantially equal to the depth of the recess 89 in the cylinder head. Each stud is hollow ended, and seated in the hollow ends of each stud, between the stud and the cylinder heads, are springs 91. The springs 91 bear at their inner ends against the stud, and at their outer ends against a cup shaped retainer washer 92 which, in turn, in the neutral position of the piston, bears against the cylinder head at the inner end of the recess 89. A bolt 93 is mounted within each stud on its longitudinal axis, each bolt having a shoulder engaging one end of the stud and a nut threaded on the bolt and engaging the opposite end of the stud, whereby movement of the stud is imparted to the bolt. A nut 94 is threaded on each end of the bolt 93, the spring retaining washer 92 being mounted on the bolt and held in predetermined position by the nut. The springs 91 are preloaded and urge the piston to neutral position whenever the ends of the cylinder 73 are open to discharge, as hereinafter more particularly described.

Passages 95 and 96 are provided through the hub 74 for admitting fluid to the respective ends of the cylinder 73, these passages registering with passages 97 and 98 extending first transversely and then longitudinally of the output shaft 32, and which, in turn, connect with passages 99 and 101 extending through a distributor plate 102 secured to the forward wall 15 of the housing 14 (see Figure 3) and from thence through the forward wall 15 to connect with the control valve and pressure pump unit mounted within the housing and bolted to the after side of the forward wall 15.

The distributor plate 102, located on the forward side of the forward wall 15, also serves as a cover plate for the output shaft bearing 33. The distributor plate provides for the flow of oil between the control valve 103 and passages 97 and 98 in the output shaft 32.

The distributor plate 102 is provided with a center hole 107 connecting the passage 97 in the output shaft 32 with passage 99 in the distributor plate through which fluid is conducted from the ahead port 104 in the control valve 103 to the forward end of the cylinder 73. An annular groove 105 in the inner surface of the plate 102 provides communication between the passage 98 in the shaft 32 and passage 101 in the distributor plate, through which fluid is conducted from the reverse port 106 in control valve 103 to the after end of the cylinder 73. Between the center hole 107 and the annular groove 105, and also between the annular groove 105 and the outer edge of the distributor plate, are second and third annular grooves 108 and 109 which carry sealing rings 111 held in sealing engagement with the forward end of the output shaft 32, initially by springs 112, and subsequently by fluid pressure back of each ring when the device is in operation.

Oil under pressure is delivered to the cylinder 73 by means of a gear pump comprising a drive gear 113 and a driven gear 114. Power to drive the pump is transmitted from the forward reduction gear 36 by way of a gear 115 keyed to the shaft 116 on which also is keyed the pump drive gear 113. The driven gear 114 is mounted on a shaft 117, the shafts 116 and 117 for the pump gears being journaled in bearings (not shown) mounted in the walls of the pump casing 118. The pump is immersed in the oil bath in the housing 14 from which it draws its supply. A screen 119 is provided over the intake port 121 for the obvious purpose of excluding foreign matters from the pump.

The gear pump discharges through passage 122 into the pressure chamber 123 of the control valve 103. The control valve 103 comprises a cylinder 124, open at one end, and having mounted therewithin a spool shaped piston 125 adapted to be moved into any one of selected positions in the cylinder 124 by means of a connecting rod 126 forming a part of a control mechanism presently to be described. The control valve 103 is provided with three ports, one being the intake port 127 through which fluid is delivered from the gear pump to the pressure chamber 123, said pressure chamber comprising the annular space between the lands of the piston 125. Ports 104 and 106 provide communication between the cylinder 124 and the passages 99 and 101, respectively, in the distributor plate 102 which register, in the manner hereinbefore described, with passages 97 and 98 in the output shaft 32, from whence the oil flows to the cylinder 73 according to the position of the control valve. When the piston 125 is moved into position to provide communication between the pressure chamber 123 and the port 104, through which fluid under pressure is delivered to the forward end of the cylinder 73, the port 106 becomes the exhaust port through which fluid is exhausted from the opposite or after end of the cylinder 73. Passages 128 provide communication between the closed end of the cylinder 124 and the upper end of the cylinder 124 above the relief valve 129, thus providing for the flow of oil from the closed end of the cylinder 124 when the port 106 is functioning as an exhaust port.

A number of openings 131 are provided through the top land 132 of the piston 125 which communicate with an annular groove 133 in the outer face of the piston. Over this groove is seated the relief valve 129 which is loaded with an adjustable spring 134 enclosed within a keeper 135. A nut 136 threaded on the valve stem 137 is provided for adjusting the amount of force exerted by the spring 134. Thus the relief valve affords a means for obtaining a sensitive adjustment of the pressure exerted on the piston mounted in cylinder 73 for holding the clutch members in engagement. It will be appreciated that each face of the piston member 81 is of a predetermined area. Adjustment of the nut 136 relative to the valve stem 137 determines the pressure required to move the relief valve 129 against the force exerted by the spring 134. It follows as a matter of course that the amount of increase or decrease in the pressure per square inch required to actuate the relief valve 129, when multiplied by the number of square inches on the face of the piston 81, determines the amount of increase or decrease in the pressure exerted on the piston 81 for holding the clutch elements in engagement. The large diameter clutch provides for a large hydraulic cylinder, and the pressure per square inch necessary to move the clutch members into engagement is correspondingly lessened.

Outwardly of the relief valve 129 the open end of the cylinder 124 is provided with a pouring spout 138 for discharging oil onto the gear mesh of the forward reduction gear 36. Preferably, the discharge from the relief valve 129 may be located at a point above the uppermost point of the cylinder 73, so that when the valve piston 125 is in neutral position and both ends of the cylinder 73 are in communication with the open end of the cylinder 124, fluid will not drain from the cylinder 73. When the control valve 103 is actuated to place the pressure chamber 123 in communication with either of the ports 104 or 106, oil is delivered to the cylinder 73 until the clutch is engaged, after which time the relief valve 129 opens and the oil is bypassed therethrough to be poured or sprayed onto the teeth of the gears 36 and 115. Instead of the pouring spout 138, the cylinder 124 may be equipped with a closure member having conduits leading therefrom and terminating in nozzles through which oil may be supplied to any working part in the casing.

Whenever the control valve 103 is actuated to supply oil under pressure to one end or the other of the cylinder 73, the end of the cylinder to which oil is supplied is constantly in communication with the overflow through the relief valve 129. Due to the centripetal force acting in the cylinder 73, by which the air present in the cylinder is forced to the center of rotation, the air is conducted into the longitudinal passages 97 and 98 in the output shaft 32 in which the air moves upwardly along these passages (due to the rake of the engine in the boat) to the control valve, from whence it is discharged through the relief valve 129, thus continually de-aerating the oil.

The control valve 103 is actuated by a mechanism comprising a detent cam 139 and lever 141 mounted on a cross shaft 142 journaled in a housing 143 secured to the main housing 14 adjacent its forward end. The detent cam 139 is provided with notches 144 for selective engagement by a detent 145 urged into working position by a spring 146 mounted in a recess 147 in the housing 143. The connecting rod 126 extends between the lever 141 and the valve stem 137 of the piston 125, the upper end of the connecting rod 126 being attached to the lever 141, the lower end of the connecting rod being attached to the valve stem 137. Provision is made for manual operation of the control valve 103 by means of an operating lever 148 keyed to the cross shaft 142, by means of which the cam 139 may be rotated to move a selected one of the notches 144 into registry with the detent 145. The force required to operate the control valve 103 being very small in proportion to the pressure exerted on the friction elements of the clutch, the mechanism is easily adapted for use with remote control apparatus for actuating any of the well known power transmitting devices employed therewith.

Having now described my invention and in what manner the same may be used, what I claim as new and desire to protect by Letters Patent is:

1. A marine reduction reverse gear unit comprising a housing, bearings mounted in the forward and after walls of said housing, an output shaft journaled in said bearings, a hydraulically actuated piston and cylinder mechanism mounted on said shaft, a gear pump and control valve unit mounted on the after side of the forward wall of said housing for energizing said piston and cylinder mechanism, fluid passages extending longitudinally of said shaft and opening through the end of said shaft, a distributor plate covering the end of said shaft and having passages providing communication between the passages in said shaft and said gear pump and control valve unit.

2. A marine reduction reverse gear unit comprising a shaft, a hub secured to said shaft, longitudinally spaced parallel flanges secured to and extending radially from said hub and comprising the driven plates of a clutch assembly, a T-shaped piston element having a portion thereof disposed between said flanges and a second portion overlying the circumferential edges of said flanges, said piston element forming a piston and cylinder and said flanges forming cylinder heads therefor, driving clutch plates disposed closely adjacent and in parallelism with said flanges at each end of said cylinder, means for inducing the movement of said piston and cylinder relative to said flanges, and means secured to said piston for pressing a selected one of said driving clutch plates into engagement with one of said flanges upon movement of said piston.

3. In a marine gear, a shaft, a pair of longitudinally spaced radial flanges on said shaft, a cylinder surrounding said flanges so that said flanges constitute cylinder heads therefor, a radial wall in said cylinder extending inwardly between said flanges to form opposed fluid pressure chambers between said flanges and said wall for moving said cylinder longitudinally with respect to said flanges, and separate clutch means operable by movement of said cylinder in opposite directions for selective engagement with said shaft.

4. In a marine reduction reverse gear, a shaft, a pair of longitudinally spaced radial flanges on said shaft, a cylinder surrounding said flanges so that said flanges constitute cylinder heads therefor, sealing rings in said flanges engaging said cylinder, a radial wall in said cylinder extending inwardly between said flanges to form opposed fluid pressure chambers between said flanges and said wall for moving said cylinder longitudinally with respect to said flanges, sealing rings between said radial wall and said shaft to separate said pressure chambers, and separate clutch means operable by movement of said cylinder in opposite directions for selective engagement with said shaft.

5. In a marine reduction reverse gear, a housing, a shaft journaled in opposite walls of said housing, forward and reverse gears journaled on said shaft, fluid pressure operated clutch means mounted on said shaft for connecting one or the other, or neither, of said gears to said shaft selectively, fluid passages for said clutch means extending longitudinally of said shaft and opening through one end of said shaft, a distributor plate covering said end of said shaft and having passages communicating individually with the passages in said shaft, and a fluid pump and control valve unit mounted adjacent said distributor plate and communicating with the passages therein, said pump being driven by one of said gears.

6. A marine reduction reverse gear comprising a transmission housing, a driving gear, a power output shaft journaled in said housing below said driving gear, forward and reverse gears journaled on said output shaft and adapted for selective engagement therewith by individual clutch means, said forward gear being in mesh with said driving gear, a countershaft journaled in said housing above said driving gear and driven thereby, a gear on said countershaft in mesh with said reverse gear, and a removable cover plate on an upper part of said housing adjacent said countershaft for utilizing said countershaft as a unidirectional power take-off for auxiliary use regardless of the direction of rotation or non-rotation of said output shaft.

7. A marine reduction reverse gear comprising a transmission housing having an oil reservoir in its bottom portion, a driving gear, a power output shaft journaled in said housing below said driving gear, forward and reverse gears cut with opposite helix journaled on said output shaft, clutch means on said shaft between said gears for connecting said gears selectively to said shaft, said gears being driven in opposite directions by said driving gear and being disposed at opposite ends of said housing whereby they are adapted to establish an oil circulation always in the same direction across the ends and along the sides of said reservoir regardless of the selective connection established by said clutch means, and a water jacket extending along opposite sides and across one end of said reservoir beneath one of said gears for counterflow cooling of said circulating oil.

8. In a marine reduction reverse gear, a transmission housing having an oil reservoir in its lower portion, forward and reverse gears rotating in opposite directions at opposite ends of said housing and thereby adapted to maintain an oil circulation around the bottom of said oil reservoir, and a water jacket extending around the bottom of said reservoir for counterflow cooling of said oil.

LEON W. HOLLINGSWORTH.

REFERENCES CITED

The following references are of record in the file of this patent:

UNITED STATES PATENTS

| Number | Name | Date |
| --- | --- | --- |
| 677,493 | Arnold | July 2, 1901 |
| 857,393 | Hagman | June 18, 1907 |
| 918,652 | Bryan | Apr. 20, 1909 |
| 993,825 | Cramer | May 30, 1911 |
| 1,351,597 | Wingfield | Aug. 31, 1920 |
| 1,731,076 | Maurer | Oct. 8, 1929 |
| 1,768,859 | Petrelli | July 1, 1930 |
| 2,017,777 | Thurber | Oct. 15, 1935 |
| 2,052,650 | Pearmain | Sept. 1, 1936 |
| 2,052,651 | Pearmain | Sept. 1, 1936 |
| 2,094,421 | Wagner | Sept. 28, 1937 |
| 2,117,852 | Pearmain | May 17, 1938 |
| 2,230,604 | Ware | Feb. 4, 1941 |
| 2,245,815 | Peterson et al. | June 17, 1941 |
| 2,283,435 | Halford et al. | May 19, 1942 |

FOREIGN PATENTS

| Number | Country | Date |
| --- | --- | --- |
| 356 | Great Britain | 1870 |
| 13,658 | Switzerland | Nov. 18, 1896 |
| 430,938 | Germany | June 25, 1926 |